US012115647B2

(12) United States Patent
Hickey

(10) Patent No.: US 12,115,647 B2
(45) Date of Patent: Oct. 15, 2024

(54) TOOLSET ORGANIZER

(71) Applicant: Bryan Hickey, Ninilchik, AK (US)

(72) Inventor: Bryan Hickey, Ninilchik, AK (US)

( * ) Notice: Subject to any disclaimer, the term of this patent is extended or adjusted under 35 U.S.C. 154(b) by 0 days.

(21) Appl. No.: 17/819,148

(22) Filed: Aug. 11, 2022

(65) Prior Publication Data

US 2024/0051114 A1 Feb. 15, 2024

(51) Int. Cl.

*B25H 3/00* (2006.01)
*A47B 87/02* (2006.01)
*A47F 5/04* (2006.01)
*A47F 5/05* (2006.01)

(52) U.S. Cl.

CPC ............... *B25H 3/00* (2013.01); *A47B 87/02* (2013.01); *A47F 5/04* (2013.01); *A47F 5/05* (2013.01)

(58) Field of Classification Search

CPC .. B25H 3/00; B25H 3/003; B25H 3/04; Y10T 403/364; Y10T 403/5706; A47F 5/04; A47F 5/05; A47F 5/06; A47F 5/14; A47F 7/0007; A47F 7/0014; A47B 87/02; A47B 87/0207; A47B 47/0091; A47B 96/145; A47B 87/0223; A47B 2087/023; A47B 87/0246

USPC .... 211/70.6, 188, 194, 196, 205, 59.4, 49.1; 206/378, 372, 376

See application file for complete search history.

(56) References Cited

U.S. PATENT DOCUMENTS

| | | | | | |
|---|---|---|---|---|---|
| 1,266,749 | A * | 5/1918 | Abbott | A47F 5/04 | 211/205 |
| 2,068,308 | A * | 1/1937 | Zerver | B25B 13/56 | 206/376 |
| 2,482,402 | A * | 9/1949 | Corcodilos | A63H 33/107 | 446/117 |
| 2,981,009 | A * | 4/1961 | Lindquist | G09B 1/36 | 273/156 |
| 3,197,034 | A * | 7/1965 | Deadrick | A47G 25/0664 | 211/1 |
| 3,383,941 | A * | 5/1968 | Nielsen | F16C 1/14 | 403/182 |
| 3,517,824 | A * | 6/1970 | Paque | A47B 49/00 | 211/165 |
| 3,635,352 | A * | 1/1972 | Brooks | B42F 15/06 | 211/47 |
| 3,783,801 | A * | 1/1974 | Engman | A47B 87/0215 | 108/190 |
| 3,831,533 | A * | 8/1974 | Kellogg | A47B 87/0215 | 108/101 |

(Continued)

*Primary Examiner* — Jennifer E. Novosad
(74) *Attorney, Agent, or Firm* — Fargo Patent & Business Law; Thomas Kading

(57) ABSTRACT

A toolset organizer includes a first connector that includes a first male connector body adjacent to a first flange along an axis, a female interface formed through the first flange and at least partially into the first male connector body to define a female interface to receive and retain a second male connector body of a second connector along the axis. Each connector is friction fit to essentially "snap" into an adjacent connector to retain a tool such as a box-end wrench between each adjacent pair of connectors with the ability to rotate the tool on a respective connector about an axis A while retaining the other connectors together. Each connector may be progressively sized to accommodate a full set of tools such as a box-end wrench set.

4 Claims, 3 Drawing Sheets

(56) References Cited

U.S. PATENT DOCUMENTS

| | | | | |
|---|---|---|---|---|
| 4,158,336 | A * | 6/1979 | Brescia | F16B 9/09 108/190 |
| 4,275,666 | A * | 6/1981 | Schriever | A47B 87/0246 108/190 |
| 4,337,860 | A * | 7/1982 | Carrigan | B25H 3/003 211/49.1 |
| 4,497,405 | A * | 2/1985 | Mikic | B25B 13/56 206/378 |
| 4,519,892 | A * | 5/1985 | Blakeslee | B25H 3/04 206/223 |
| 4,771,895 | A * | 9/1988 | Steiner | D06F 57/12 211/105.3 |
| 4,852,501 | A * | 8/1989 | Olson | A47B 57/265 108/107 |
| 4,936,472 | A * | 6/1990 | Meier | G02B 7/00 211/59.4 |
| 5,020,666 | A * | 6/1991 | Barlean | B25H 3/04 206/372 |
| 5,040,681 | A * | 8/1991 | Grusin | B43M 99/008 206/505 |
| 5,108,141 | A * | 4/1992 | Anderson | B60R 9/00 296/3 |
| 5,176,465 | A * | 1/1993 | Holsted | A47B 87/02 403/379.6 |
| 5,219,081 | A * | 6/1993 | Lin | A47G 25/0664 211/205 |
| 5,318,189 | A * | 6/1994 | Lee | A47G 25/0664 211/205 |
| 5,401,200 | A * | 3/1995 | Ellis | A63H 33/04 446/124 |
| 5,715,948 | A * | 2/1998 | Hung | A47B 81/068 403/205 |
| 6,070,743 | A * | 6/2000 | Hsueh | A47B 81/068 211/40 |
| 6,158,360 | A * | 12/2000 | Cheng | A47B 49/004 108/103 |
| 6,196,398 | B1 * | 3/2001 | Lowe | D06F 57/12 211/96 |
| 6,206,493 | B1 * | 3/2001 | Sanchez-Levin | A47F 5/05 312/249.2 |
| 6,273,277 | B1 * | 8/2001 | Geldenhuys | B25H 3/025 211/115 |
| 6,305,542 | B1 * | 10/2001 | Barbrow | B25H 3/04 206/375 |
| 6,308,838 | B1 * | 10/2001 | Endean | A47F 7/08 211/205 |
| 6,425,490 | B1 * | 7/2002 | Ta | A47G 25/743 211/13.1 |
| 6,568,546 | B1 * | 5/2003 | Huang | A47K 10/04 211/205 |
| 6,575,312 | B2 * | 6/2003 | Santa Cruz | A47F 7/0028 211/70.6 |
| 6,722,511 | B1 * | 4/2004 | Lowe | A47F 5/0838 211/119.004 |
| 6,796,565 | B2 * | 9/2004 | Choi | B62B 3/02 280/47.35 |
| 6,832,685 | B2 * | 12/2004 | Chang | B25H 3/003 206/759 |
| 6,996,927 | B2 * | 2/2006 | Meidinger | G09F 19/00 211/163 |
| 7,144,610 | B1 * | 12/2006 | Estes | A47F 5/04 428/17 |
| 7,798,076 | B1 * | 9/2010 | Neff | A47B 87/02 108/157.13 |
| 7,975,855 | B2 * | 7/2011 | Lin | B25H 3/025 211/70.6 |
| 8,061,536 | B2 * | 11/2011 | Lin | B25H 3/025 206/478 |
| 8,069,997 | B2 * | 12/2011 | Cheng | B25H 3/04 206/349 |
| 8,240,488 | B2 * | 8/2012 | Huang | B05B 13/0292 211/107 |
| 8,286,807 | B2 * | 10/2012 | Winnard | B25H 3/003 211/70.6 |
| 8,316,765 | B2 * | 11/2012 | Blanks | G09F 3/0295 220/23.88 |
| 8,371,456 | B2 * | 2/2013 | Scadden | F26B 25/185 211/59.4 |
| 8,870,133 | B1 * | 10/2014 | Brown | F24B 1/193 211/196 |
| 9,538,861 | B2 * | 1/2017 | Young | A47F 5/04 |
| 11,712,794 | B1 * | 8/2023 | Lai | B25H 3/003 211/208 |
| 2003/0071000 | A1 * | 4/2003 | Maser | B25H 3/003 206/378 |
| 2006/0065613 | A1 * | 3/2006 | McKay | A47F 5/02 211/85.2 |
| 2006/0070968 | A1 * | 4/2006 | Terhune | A47G 23/02 211/205 |
| 2006/0138066 | A1 * | 6/2006 | Hung | A47F 5/10 211/189 |
| 2008/0000865 | A1 * | 1/2008 | Babcock | A47F 5/04 211/205 |
| 2008/0041799 | A1 * | 2/2008 | Nguy | B25H 3/023 211/70.6 |
| 2008/0061020 | A1 * | 3/2008 | Kaisler | A47B 31/02 211/205 |
| 2008/0197131 | A1 * | 8/2008 | Lin | B25H 3/025 220/23.83 |
| 2013/0240394 | A1 * | 9/2013 | Wang | B25H 3/04 206/349 |
| 2015/0233639 | A1 * | 8/2015 | Mustari | A47B 61/02 211/172 |
| 2016/0176596 | A1 * | 6/2016 | Kuipers | A47B 87/0269 211/85.3 |
| 2019/0254424 | A1 * | 8/2019 | Rassat | F16B 12/10 |
| 2023/0110104 | A1 * | 4/2023 | Ingram | A47F 5/0815 211/94.01 |
| 2023/0244636 | A1 * | 8/2023 | Russell | G06F 16/285 707/694 |
| 2024/0051114 | A1 * | 2/2024 | Hickey | A47F 5/04 |

* cited by examiner

TOOLSET ORGANIZER

CROSS-REFERENCE TO RELATED APPLICATION(S)

None.

FIELD

The present application generally relates to a toolset organizer that organizes wrenches.

BACKGROUND

Toolboxes often contain various tools, however, often become somewhat unorganized. Although wrench trays, racks, or compartment slots facilitate organization of tools, these devices may be bulky and waste space within the toolbox.

SUMMARY

A toolset organizer according to one disclosed non-limiting embodiment of the present disclosure includes a first polygonal section adjacent the first flange along the axis. A further embodiment of any of the foregoing embodiments of the present disclosure includes a first male interface adjacent to the first polygonal section along the axis, the first male interface sized to fit within a female interface formed through a second flange and at least partially into the second male connector body of the second connector along the axis. A further embodiment of any of the foregoing embodiments of the present disclosure includes that the first polygonal section is sized to receive a first box-end wrench.

A further embodiment of any of the foregoing embodiments of the present disclosure includes a first polygonal section adjacent the first flange along the axis.

A further embodiment of any of the foregoing embodiments of the present disclosure includes a first male interface adjacent to the first polygonal section along the axis, the first male interface sized to fit within a female interface formed through a second flange and at least partially into the second male connector body of the second connector along the axis.

A further embodiment of any of the foregoing embodiments of the present disclosure includes, wherein the first polygonal section is sized to receive a first box-end wrench.

A further embodiment of any of the foregoing embodiments of the present disclosure includes a second male polygon section connector body adjacent the second flange of the second connector along the axis, the second male polygon section connector body is sized to receive a second box-end wrench, the second male polygon section connector body different than the first male polygon section connector body.

A further embodiment of any of the foregoing embodiments of the present disclosure includes a polygon end cap adjacent the first flange along the axis.

A further embodiment of any of the foregoing embodiments of the present disclosure includes that the polygon end cap forms a dome covering the first flange, the first female interface of the polygon end cap has ridges that seamlessly and comfortably snaps onto the ridges of a first male interface of the first connector.

A further embodiment of any of the foregoing embodiments of the present disclosure includes, wherein the polygon end cap snaps onto multiple connectors starting with the first connector.

A further embodiment of any of the foregoing embodiments of the present disclosure includes that the multiple connectors that snap together away from the polygon end cap progressively and proportionately taper off in size.

A further embodiment of any of the foregoing embodiments of the present disclosure includes that the multiple connectors' polygonal sections and are sized to receive a box-end wrenches that progressively and proportionately taper off in size.

The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
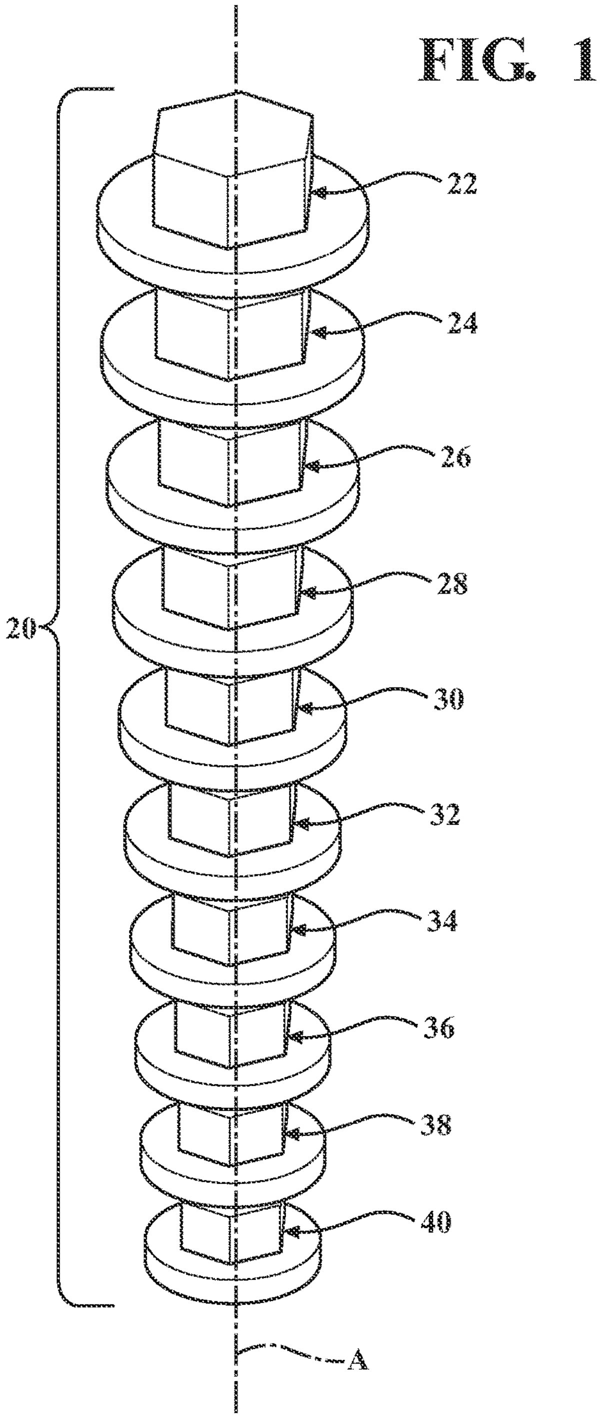
FIG. 1 is a perspective view of a toolset organizer with a multiple of connectors connected together according to one disclosed non-limiting embodiment.

FIG. 1 illustrates an example embodiment of the toolset organizer 20. The toolset organizer 20 includes a multiple of connectors 22, 24, 26, 28, 30, 32, 34, 36, 38, 40, each of which are connectable together. Although a particular number of connectors are illustrated in the disclosed embodiment, it would be appreciated that any number thereof may form the organizer 20. Each connector, is friction fit to essentially "snap" into an adjacent connector to retain a tool such as a box-end wrench between each adjacent pair of connectors 22, 24, 26, 28, 30, 32, 34, 36, 38, 40 with the ability to rotate the tool on a respective connector 22, 24, 26, 28, 30, 32, 34, 36, 38, 40, 42 about an axis A while retaining the other connectors together. Each connector 22, 24, 26, 28, 30, 32, 34, 36, 38, 40 may be progressively sized to accommodate a full set of tools such as a box-end wrench set. The toolset organizer 20 provides ease of wrench accessibility, identification, and transportation, and allows users to rotate desired wrenches individually while maintaining other wrenches in a desired locked or flushed position.

The first connector 24 is exemplary of each of the connectors and generally includes a first male interface **24*a*, a first male polygon section connector body 24*b* adjacent to a second flange 24*c* along axis A. The first male polygon section connector body 24*b* may be specific to the tool such as a hexagonal wrench. A second female interface 24***d* is formed through the second flange 24*c* and at least partially into the first male polygon section connector body 24*b* to receive and retain a second male interface 26*a* of a second connector 26 along the axis. The corresponding male and female interfaces may be formed as, for example, a complimentary truncated conical section, a complimentary cylindrical section, or other geometric configuration which provide a mating interface.

Although the first connector 24 is exemplary of each of the connectors, a connector may be a polygon end cap 22 that need not include the male interface portion. The connector polygon end cap 22 may include a first flange 22*c* along axis A to define a first female interface 22*d* to receive and retain the first male interface 24*a* of a first connector 24 along the axis A.

The first male polygon section connector body 24*b* may be sized to receive a first box-end wrench 50, where the first box-end wrench 50 is placed onto the first male polygon section connector body 24*b*, so that the first box-end wrench 50 is retained between the first flange 22*c* and second flange 24*c*.

The second male interface 26*a* is sized to fit within the first female interface 22*d* formed through a second flange 24*c* and at least partially into the second male polygon section connector body 26*b* of the second connector 26 along the axis A. The second male polygon section connector body 26*b* is adjacent to the second flange 24*c* of the second connector 26 along the axis A, the second male polygon section connector body 26*b* is sized to receive a second box-end wrench 52, where the second male polygon section connector body 26*b* is different than the first male polygon section connector body 24*b*. The third through ninth connectors of the illustrated embodiment follow the same pattern as described above.

Figure 2:
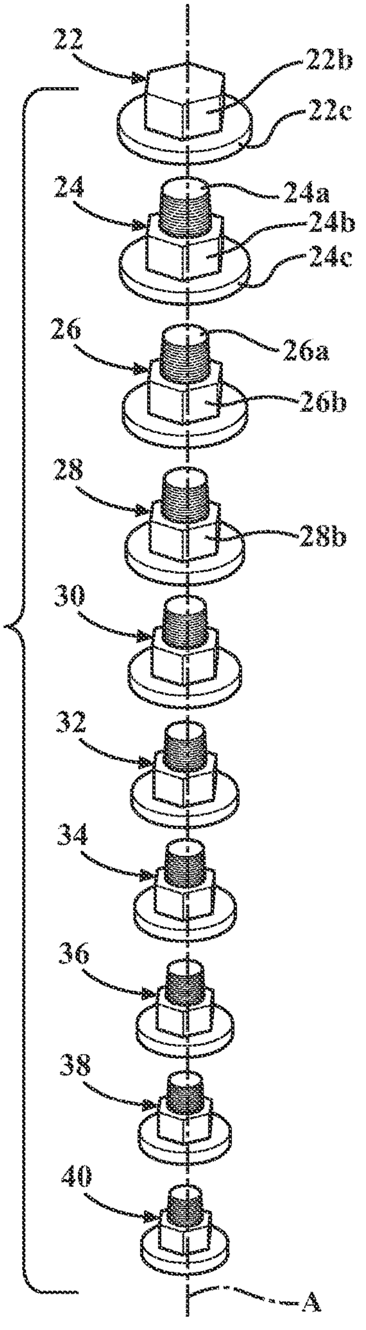
FIG. 2 is an exploded view of the toolset organizer in which the connectors proportionately increase in size from right to left.

With reference to FIG. 2, the connectors are shown separated along the axis A, such that the connectors increase in size from top to bottom as shown in FIG. 2. The ninth connector 40 in this embodiment is the smallest connector to receive the smallest tool of the toolset. This is followed by the eight connector 38, seventh connector 36, sixth connector 34, fifth connector 32, fourth connector 30, third connector 28, second connector 26, first connector 24, and ending with the polygon end cap 22.

Figure 3:
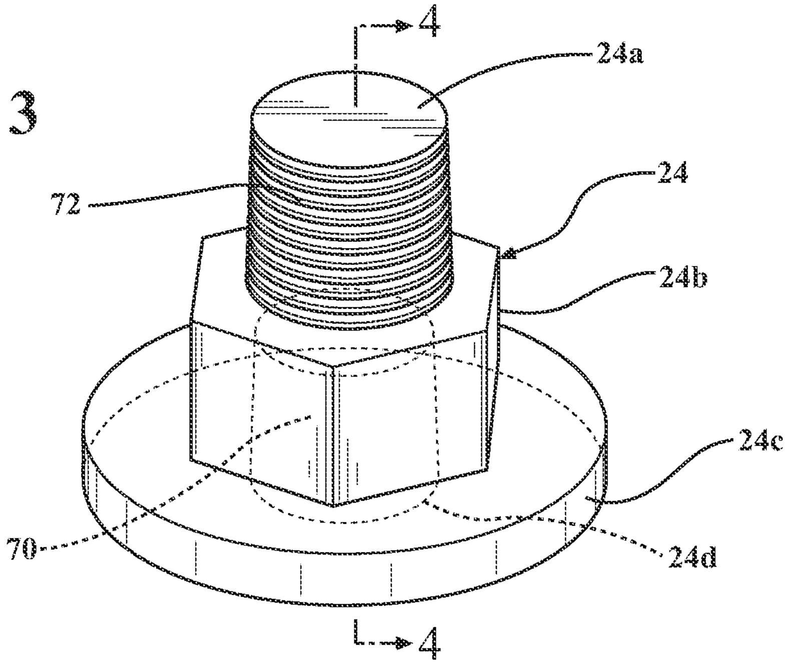
FIG. 3 is front perspective of a toolset organizer organizing connectors snapped together and progressively getting larger from front to back.

With reference to FIG. 3, the first male interface 24*a* that is adjacent to the first male polygon section connector body 24*b* has first male interface ridges 72 that insert into a first female interface ridges 70 (FIG. 4) that allow for retention between the connectors. Once the connectors are snapped together, a tool may be retained axially between a pair of connectors on the polygonal section but may also be individually rotated with respect to other tools.

Figure 4:
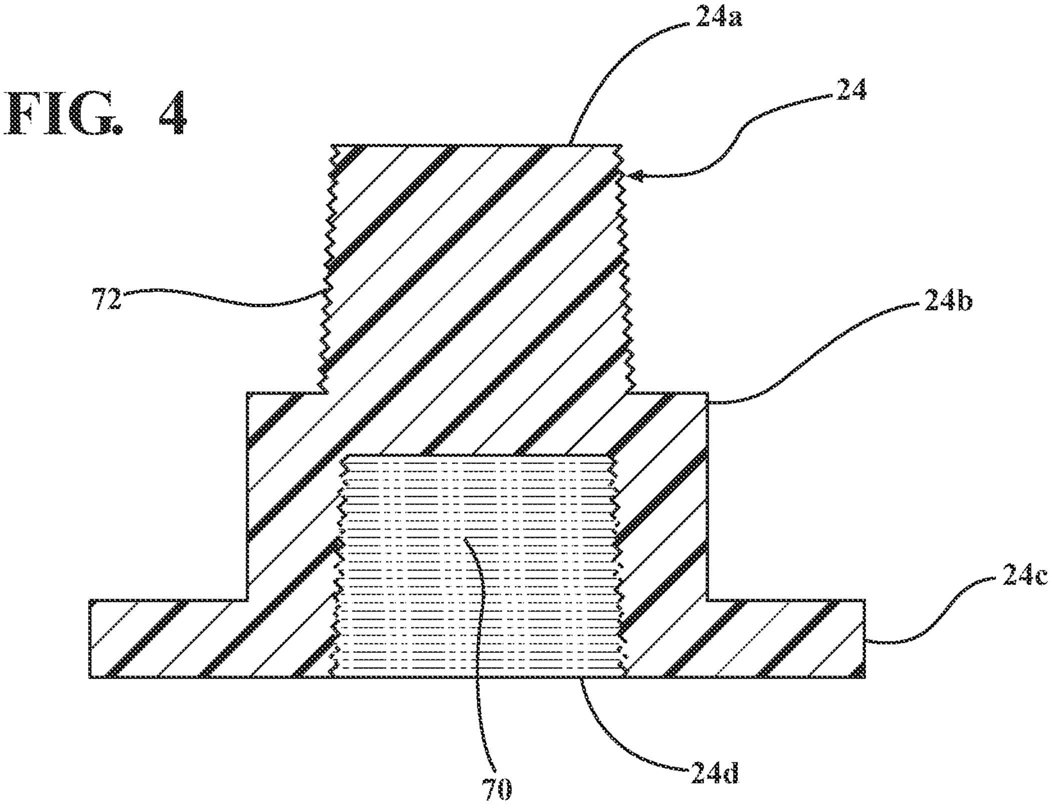
FIG. 4 is a schematic cross-sectional view of a single connector illustrating a male and female interface of between two connectors.

With reference to FIG. 4, the first male interface ridges 72 from the first male interface 24*a* for both the first connector 24 and the polygon end cap 22 provide for an interface therebetween. The first male interface 24*a* of the first connector 24 is inserted into and penetrates the first female interface 22*d* of the polygon end cap 22. Both the first flange 22*c* and the second flange 24*c* serve as reference points to illustrate the depth of how the top of the first male interface 24*a* and the first male polygon section connector body 24*b*, of the first connector 24, penetrate into the first female interface 22*d* of the polygon end cap 22.

The female and/or male interfaces include ridges or other friction including features to facilitate retention along the axis A as well rotation about axis A. In one embodiment, the first female interface ridges 70 and first male interface ridges 72 in this embodiment are defined about the axis A. The first male interface ridges 72 interface with the first female interface ridges 70 such that the connectors essentially "snap" together. Once the connectors are snapped together, a tool may be retained axially between each pair of connectors on the respective polygonal section but may also be individually rotated with respect to other tools.

Figure 5:
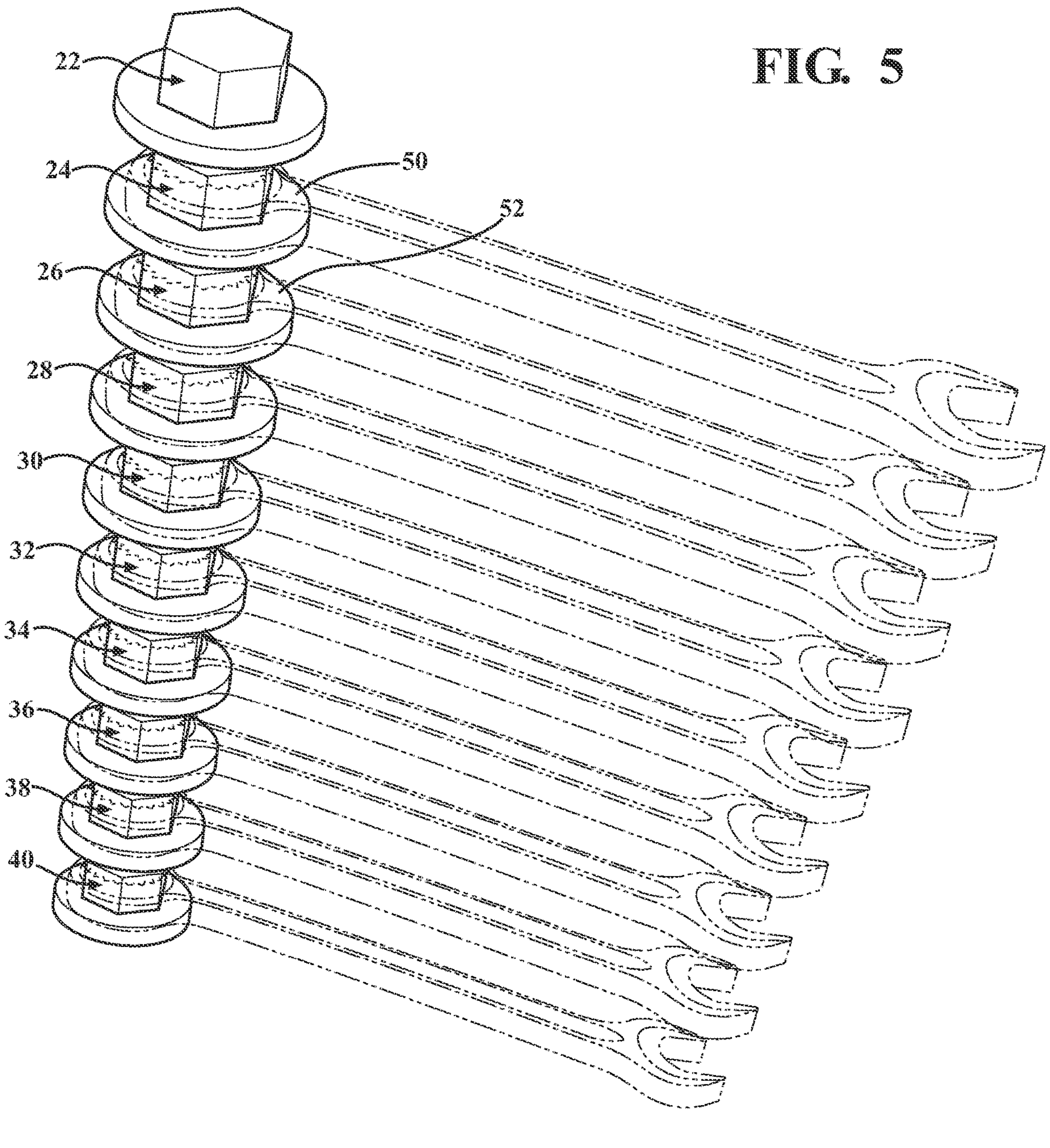
FIG. 5 side view of the toolset organizer illustrating organization of a multiple of box-end wrenches.

With reference to FIG. 5, the connectors are readily assembled together to form the toolset organizer 20 to organize an example set of box-end wrenches, each of which are of different sizes. The toolset organizer 20 facilitates organizing the box-end wrenches while allowing rotation about axis A to facilitate identification and removal of an induvial wrench. That is, connectors can also be individually separated to access individual wrenches that may be otherwise difficult to retrieve because the desired wrench is located in the middle of the toolset organization arrangement.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

While various inventive aspects, concepts and features of the general inventive concepts are described and illustrated herein in the context of various exemplary embodiments, these various aspects, concepts, and features may be used in many alternative embodiments, either individually or in various combinations and sub-combinations thereof.

Unless expressly excluded herein all such combinations and sub-combinations are intended to be within the scope of the general inventive concepts. Still further, while various alternative embodiments as to the various aspects, concepts, and features of the inventions (such as alternative materials, structures, configurations, methods, devices and components, alternatives as to form, fit and function, and so on) may be described herein, such descriptions are not intended to be a complete or exhaustive list of available alternative embodiments, whether presently known or later developed.

Those skilled in the art may readily adopt one or more of the inventive aspects, concepts or features into additional embodiments and uses within the scope of the general inventive concepts even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary, or representative values and ranges may be included to assist in understanding the present disclosure; however, such values and ranges are not to be construed in a limiting sense and are intended to be critical values or ranges only if so expressly stated.

Moreover, while various aspects, features and concepts may be expressly identified herein as being inventive or forming part of an invention, such identification is not intended to be exclusive, but there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A toolset organizer for organizing box-end wrenches, the toolset organizer comprising:

a multiple of connectors each comprising a male polygon section connector body adjacent to a flange along an axis, each male polygon section connector body different in size to receive only a single respective box-end wrench, each of the multiple of connectors receivable into another of the multiple of connectors along the axis; and a cylindrical section that extends from the male polygon section connector body along the axis of each of the multiple of connectors, the cylindrical section receivable into an opening through the flange and at least partially into the male polygon section connector body of another of the multiple of connectors.

2. A toolset organizer for organizing box-end wrenches, the toolset organizer comprising:

a multiple of connectors each comprising a male polygon section connector body adjacent to a flange along an axis, each male polygon section connector body different in size, each of the multiple of connectors receivable into another of the multiple of connectors along the axis; and a cylindrical section that extends from the male polygon section connector body along the axis of each of the multiple of connectors, the cylindrical section receivable into an opening through the flange and at least partially into the male polygon section connector body of only one of the multiple of connectors.

3. A toolset organizer for organizing box-end wrenches, the toolset organizer comprising:

a multiple of connectors each comprising a male polygon section connector body adjacent to a flange along an axis, each male polygon section connector body different in size, each of the multiple of connectors receivable into another of the multiple of connectors along the axis; and a cylindrical section that extends from the male polygon section connector body along the axis of each of the multiple of connectors, the cylindrical section receivable into an opening through the flange and at least partially into the male polygon section connector body of only one of the multiple of connectors such that each of the box-end wrenches are organized by size along the axis, wherein each male polygon section connector body comprises a hexagon.

4. The first connector as recited in claim 3, further comprising ridges on each cylindrical section.

* * * * *